United States Patent
Rivadeneira Hurtado

(10) Patent No.: US 10,036,081 B2
(45) Date of Patent: Jul. 31, 2018

(54) POLYMER SUPPORT AND METHOD OF LEACHING OF MINERAL CONCENTRATES

(71) Applicant: SOCIEDAD PUNTA DEL COBRE S.A., Las Condes (CL)

(72) Inventor: Juan Rivadeneira Hurtado, Las Condes (CL)

(73) Assignee: SOCIEDAD PUNTA DEL COBRE S.A., Las Condes (CL)

( * ) Notice: Subject to any disclaimer, the term of this patent is extended or adjusted under 35 U.S.C. 154(b) by 575 days.

(21) Appl. No.: 14/622,962

(22) Filed: Feb. 16, 2015

(65) Prior Publication Data
US 2016/0201161 A1 Jul. 14, 2016

(30) Foreign Application Priority Data

Jan. 9, 2015 (CL) .................................. 0059-2015

(51) Int. Cl.
*C22B 15/00* (2006.01)
*C22B 1/14* (2006.01)
*C22B 3/06* (2006.01)
*C22B 3/18* (2006.01)

(52) U.S. Cl.
CPC ............ *C22B 15/0067* (2013.01); *C22B 1/14* (2013.01); *C22B 3/06* (2013.01); *C22B 3/18* (2013.01); *C22B 15/0004* (2013.01); *C22B 15/0008* (2013.01); *Y02P 10/234* (2015.11)

(58) Field of Classification Search
CPC ....... C22B 15/0071; C22B 1/244; C22B 3/08; C22B 3/18; C22B 11/04
USPC ...................................... 423/41, 27, DIG. 17
See application file for complete search history.

(56) References Cited

U.S. PATENT DOCUMENTS

| | | | |
|---|---|---|---|
| 5,766,930 A | 6/1998 | Kohr | |
| 6,063,158 A | 5/2000 | Sharp et al. | |
| 6,083,730 A | 7/2000 | Kohr | |
| 6,096,113 A | 8/2000 | Schaffner et al. | |
| 8,119,085 B2 | 2/2012 | Hunter et al. | |
| 8,491,701 B2 | 7/2013 | Uhrie et al. | |
| 2009/0104474 A1* | 4/2009 | Schwartz | A61L 27/14 428/704 |

FOREIGN PATENT DOCUMENTS

CN 102230084 B 1/2013

OTHER PUBLICATIONS

Acevedo, "The use of reactors in biomining processes," Electronic Journal of Biotechnology. 3(3):184-94 (2000).
Barreto et al., "Identification of a Gene Cluster for the Formation of Extracellular Polysaccharide Precursors in the Chemolithoautotroph Acidithiobacillus ferrooxidans," Applied and Environmental Microbiology. 71(6):2902-9 (2005).
Breed et al., "The Effect of Temperature on the Continuous Ferrous-iron Oxidation Kinetics of a Predominantly Leptospirillum ferrooxidans Culture," Biotechnol. Bioeng. 64:44-53 (1999).
Clark et al., "Biotechnology in minerals processing: Technological breakthroughs creating value," Hydrometallurgy. 83:3-9 (2006).
Goebel et al., "Cultural and Phylogenetic Analysis of Mixed Microbial Populations Found in Natural and Commercial Bioleaching Environments," Applied and Environmental Microbiology. 60(5):1614-21 (1994).
Hahn et al., "Aquasols: on the role of secondary minima," Environ Sci Technol. 38(22):5915-24 (2004). Abstract provided.
Hurtado, "Biohydrometallurgical Processes: A practical approach," First Chapter: Challenges in practicing the bioleaching process. Edited by Luis Gonzaga Santos Sabra!, Débora Monteiro de Oliveira, Carlos Eduardo Games de Souza, published by Centre for Mineral Technology (CETEM) in Rio de Janiero, Brazil, 2010. 20 pages.
Meruane et al., "Novel Electrochemical-Enzymatic Model Which Quantifies the Effect of the Solution Eh on the Kinetics of Ferrous Iron Oxidation With Acidithiobacillus ferrooxidans," Biotechnology and Bioengineering. 80(3):280-8 (2002).
Montealegre et al., "Copper sulphide hydrometallurgy and the thin layer bacterial technology of Sociedad Minera Pudahuel." Proceedings of Cooper '95 Symposium. Santiago, Nov. 1995. pp. 781-793.
Rohwerder et al., "Bioleaching review part A: Progress in bioleaching: fundamentals and mechanisms of bacterial metal sulfide oxidation," Appl Microbial Biotechnol. 63:239-48 (2003).
Vardanyan et al., "Immobilization of new isolated iron oxidizing bacteria on natural carriers," Advanced Materials Research. 825:388-91 (2013).

\* cited by examiner

*Primary Examiner* — Steven J Bos
(74) *Attorney, Agent, or Firm* — Hoffman Warnick LLC

(57) ABSTRACT

In one embodiment, the invention provides a leaching method using a support made of a polypropylene material to form agglomerates with a metal bearing material or mineral concentrates.

8 Claims, No Drawings

POLYMER SUPPORT AND METHOD OF LEACHING OF MINERAL CONCENTRATES

CROSS-REFERENCE TO RELATED APPLICATIONS

This application claims the benefit of co-pending Chilean Patent Application No. CL 0059-2015, filed 9 Feb. 2015, which is hereby incorporated herein as though fully set forth.

BACKGROUND

The present invention is related to a new support material to agglomerate mineral concentrates that permits the subsequent recovery of their metals of economical value via leaching. More specifically, it refers to the use of a support comprising of polymeric particles that are between 3 and 20 mm, non-porous, with a specific gravity less than 1, stable in highly corrosive environments such as strong acid solutions, resistant to abrasions, non-deformable at temperatures of up to 100° C., with the capacity for mineral concentrates to stably stick on the support's surface forming an agglomerate that can be easily available in a homogeneous pack, to allow for the spatial disposition of the concentrates in a fine layer on the support, via a physical process that allows said concentrate to agglomerate by using a rotary drum.

The reserves of oxidized minerals of high grade copper will continue to diminish in Chile and other parts of the world which in turn will cause the closure or diminish the operative capacity of the majority of the acid leaching operating plants within the next decade. As a result, other alternatives will be sought after such as solvent extraction (SX) and electrowinning (EW) installations required to concentrate and eletrodeposit the copper contained in the rich pregnant leach solutions (PLS) and charged electrolyte, respectively. In addition, due to the decrease in the exploitation of oxidized copper mineral resources, a significant increase in the exploitation of copper sulfide minerals can be foreseen in Chile. These minerals are normally treated by milling and flotation to generate high concentrations of copper sulfide minerals, which must be later treated by smelting. Currently, approximately 80% of the copper produced in Chile is via pyrometallurgy used in smelting plants. Concentrations of chalcopyrite ($CuFeS_2$) are exclusively refined by this method. However, this method possesses inherent problems such as: high capital investment in which only large reserves are economically feasible for the exploitation of copper; elevated operating costs; and large volumes of $SO_2$ gas emissions that require complex processes in order for the emission to be purified and finally $SO_2$ is recovered in the form of sulfuric acid ($H_2SO_4$). If the sulfuric acid cannot be sold, it must be neutralized for it to be disposed of in an environmentally safe manner. Smelting plants, in turn, present problems with the emission of metallic dust, fugitive gases, and residual acidic solutions with high contents of Pb, As, Sb, Cu, Zn, Hg, Bi and Se that prevent the treatment of copper minerals with high concentrations of these contaminants, as a result, losing enormous reserves of copper sulfide minerals not available to be treated as it is in the case of enargite minerals ($Cu_3AsS_4$).

The largest proportion of mineralized copper as primary and secondary copper sulfides is found in the form of chalcopyrite. Table 1 shows in ascending order the sulfide minerals that are the most resistant to be leached. As it can be seen, chalcopyrite is in the second to last place and as a practical consequence it is the most recalcitrant copper mineral to be leached, requiring high temperatures and pressure to be dissolved.

TABLE 1

| Minerals according to its ascending resistance to oxidation | |
|---|---|
| Pyrrhotite | FeS |
| Chalcocite | $Cu_2S$ |
| Covellite | CuS |
| Tetrahedrite | $3Cu_2S \cdot Sb_2S_3$ |
| Bornite | $Cu_5FeS_4$ |
| Galena | PbS |
| Arsenopyrite | FeAsS |
| Sphalerite | ZnS |
| Pyrite | $FeS_2$ |
| Enargite | $Cu_3AsS_4$ |
| Marcasite | $FeS_2$ |
| Chalcopyrite | $CuFeS_2$ |
| Molybdenite | $MoS_2$ |

Due to the difficulties and the restrictions of the pyrometallurgy route, hydrometallurgy alternatives have been developed for the process of concentrates.

Among the diverse technologies of hydrometallurgy, bioleaching is an attractive alternative. Bioleaching is a solubilization methodology of metals starting from the oxidation of a complex mineral matrix, using the direct or indirect action of microorganisms. These microorganisms, in general, are capable of oxidizing some compounds such as iron ferrous and sulfur. The bacterial oxidation of minerals is a term applied to the microbiological solubilization of the contents of a mineral either to extract the valuable metal (i.e. bioleaching process) or to remove the contents of the mineral that accompany the metal of interest (i.e. biooxidation process) (1).

The majority of the microorganisms commercially used in the bioleaching process are acidophilic mesophilic bacteria which are mostly found in environments of high acidity and moderate temperatures (20-30° C.). However, in the last decades a series of studies and processes have been developed with extreme thermophilic microorganisms, isolated from hot springs and metallurgical processes, which live in environments of high quantities of salt and temperatures above 60° C. These microorganisms have shown to be more efficient in the dissolution of recalcitrant minerals than mesophilic bacteria.

There are various factors that affect the leaching and recovery of the metals of interests. The most important ones are: the type of reactor used, either heap, dump, stirred-tank or pressure leaching; the granulometry and dispersion of the fine material; the presence of clay and complex calcareous; the operating temperature of the reactor; the pH and the concentration of free acid in the leaching solutions; the type of mineral; and the ion concentration of potential inhibitors; among others.

From these references, a large quantity of studies and processes have been developed for the commercial application of bioleaching, allowing for the development of the designs of bioreactors such as the stirred-tank reactor or heap reactor.

The advantages of implementing systems of bioleaching and the recovery of metals of interests, among others, are that microbial extraction processes of metals present fewer risks for the environment than other metallurgy processes. The reason is that bioleaching processes do not require such intensive amounts of energy and produce sulfur dioxide nor other damaging gases, permitting that mineral concentrates with high grades of impurities be processed.

It is known that the leaching of chalcopyrite minerals, and in general primary copper sulfides and iron sulfides, is deflective to acid attack in heap leaching at an ambient temperature (moderate). This is due to the rapid passivation of the leached mineral by a layer of precipitates that forms on the surface of the mineral. These surface deposits significantly reduce the total kinetic recovery of copper in bioleaching. The formation of this passive layer greatly depends on the condition and variations of temperature, pH and oxygen concentration of the bed of the heap (2, 14). To avoid the formation of this passive layer, different leaching technologies for chalcopyrite, some physical-chemical nature, have been developed such as pressure leaching for copper concentrates. Through the application of high pressure of oxygen in an autoclave and a controlled adjusted temperature, a faster oxidation reaction can be achieved, in minutes to hours, and the formation of sulfur is present at the end of the process either in the form of elemental S° or sulfate $SO_4=$. The disadvantage of these pressure reactors is their high capital and operating costs, and they have only been successfully used commercially in oxidation processes of minerals that contain gold, silver, and molybdenite. This is due to the fact that pure pressurized oxygen is used as the reagent in which enormous electrical energy is consumed, elevating the operating costs. Another technology, more chemical in nature, is one developed by Compañía Minera Michilla S.A., controlled by Antofagasta PLC, called CUPROCLOR (3). This technology is applied for the leaching of copper sulfides in heaps in the presence of excess chloride ions in the leaching solution, (90 g/L total chloride ions, 30 g coming from sea water used and the additional 60 g in the form of calcium chloride). The technology allows the presence of two redox couples Cu(II)/Cu(I) and Fe(III)/Fe(II) in solution and simultaneously avoids the formation of the passive layer of precipitates, resulting in high percentages of copper recovery (close to 95%). However, this model is not easily reproducible in transforming other oxidation leaching plants into sulfide processing plants.

Even though the bioleaching technology of primary copper sulfides at high temperatures offers an economical and environmentally friendly solution to the recovery problems generated by the formation of a passive layer on the surface of a particle during leaching, this technology has not been applied commercially for the bioleaching of neither chalcopyrite nor enargite concentrates, except in laboratory and stirred-tank reactor trail experiences, using thermophilic microorganisms such as in the BIOCOP process of Codelco Chile and BHP Billiton. However, the bioleaching process in a stirred-tank reactor has not been able to be developed into a commercially viable process because of the high investment costs required and the operational complexities demonstrated in the process trails (4).

In general, heap leaching of a layer of agglomerated concentrate on a support particle can be described as a process guided by a model of thin-layer leaching. As far as a good diffusion of oxygen is established in the bed and a high temperature in the interior of the heap leaching is maintained, to avoid the formation of jarosite precipitates on the surface of the particle to be leached, the leaching of copper sulfide minerals is made possible (5, 6). This system, in contrast to the stirred-tank, permits that the microorganisms capable of bioleaching stick to the surface of the mineral, forming a biofilm structured in base of a matrix of microorganisms and polysaccharides secreted by the microorganisms. Said matrix allows for a more effective bioleaching of the mineral particle (7).

In order to reach and maintain the required temperatures to achieve the bioleaching of copper sulfide minerals, different populations of iron-oxidizing and sulfur-oxidizing bacteria with different optimal growth temperatures are required to be present over time, attempting to optimize the growth rates of the different consortia (8). In relation to the use of microorganisms in leaching processes, there has been a change in perspective in the last decade due to the increase in complexity as an ever increasing diversity of microorganisms present in such environments. Today, the use of a microbiological consortia is being explored instead of a few primarily described "key" microorganisms, such as *Acidithiobacillus ferrooxidans, A. thiooxidans* or *Leptospirillum* (9,10), to which other microorganisms are added such as *Acidianus brierley, A. thermosulfooxidans, Sulfubacillus thermosulfoxidans*. This has happened, in part, to the significant contribution generated by the investigation of the microbial ecology field that has shown a wide diversity of microorganisms present in the natural environment of mining processes.

Currently, thermophilic microorganisms (bacteria or archaea), both moderate ones (with the capacity to grow at temperatures between 50 and 60° C.) and extreme thermophiles (with the capacity to grow at temperatures above 60° C.) having demonstrated to be capable of recovering copper from chalcocite minerals, have joined at a level of physical models and at a prototype and trail scale of copper sulfide bioleaching operations. The chemical reactions, carried out by metabolic activities of the microorganisms present in the biohydrometallurgical environments of sulfide biooxidation, generate the physicochemical conditions necessary to elevate the temperatures inside the leaching reactors, observed in reactor types such as stirred-tank, heap or dump present in current mining operations.

Biolixiviación de calcopirita.

Chalcopyrite ($CuFeS_2$) is the most recalcitrant copper sulfide to oxidation. Under the influence of *A. ferrooxidans*, the speed of oxidation of this sulfide increases significantly in comparison to purely chemical processes. Secondary copper sulfides, chalcocite ($Cu_2S$), covellite ($CuS$), and bornite ($Cu_5FeS_4$) are more easily oxidized by direct or indirect action of bacteria. At an industrial level, the bioleaching technology has been applied in heaps (Chile, USA, Peru, etc.). Southern Peru has applied the technology for the recovery of copper in its low grade sulfides dumps of Toquepala. In Chile, Billiton and Codelco, in years past, carried out investigations to recover copper contained in arsenic minerals, a process named BIOCOP. Even though the process gave positive results from the kinetic point of view, it did not develop further into nor establish itself as a commercial process (11).

Bioleaching of Other Metal Sulfides.

Gold recovery: bacterial leaching is also used to break the sulfide matrix (mainly pyrite and/or arsenopyrite) that is found "trapped" in the gold-bearing particle, allowing the subsequent recovery of the gold through conventional cyanidation. In other words, the process is a pretreatment before the direct dissolution of the metal. Bactech, from Australia, has developed a process that uses moderately thermophilic bacteria for the treatment of sulfides and base metals known as the BACTECH process (12). The preliminary evaluations have reported the recovery of up to 98% of the gold contained in the mineral.

Zinc Recovery: the bacterial action in zinc sulfide has also been evaluated. Even though there are no known commercial plants, its application has enormous potential. Sphalerite is the most oxidizable zinc sulfide, influenced greatly by the presence of iron.

Lead Recovery: the bacterial leaching of galena originates the formation of $PbSO_4$ that is insoluble in an acidic medium, a property that can be applied in the separation of some metal values contained in a lead ore.

Nickel Recovery: Nickel is leached from sulfides (pentlandite and millerita) and of iron ores in the presence of *A. ferroocidans*, which is 2 to 17 times faster than a purely chemical process.

Antimony Recovery: There is some work that reports the ability of *At. ferrooxidans* to oxidize stibnite ($SB_2S_3$) at pH 1.75 and at 35° C. In addition, *At. thiooxidans* is also reported to be capable to oxidize this sulfide.

Recovery of Rare Earth Mineral Metals: The rare earth metals are present in the crystalline portion of many sulfides and silicate minerals. In order to free the metals, it is necessary to oxidize the sulfides or destroy the matrix of the silicates. Literature reports the possibility of oxidizing a variety of these metals by using bacteria from the *Acidithiobacillus* genus, such as: gallium and cadmium present in sphalerite (the main transporter of these elements); of germanium and cobalt, of rhenium, selenium and tellurium, titanium and uranium, among others.

Previous Relevant Patents

Patent CN102230084 B describes a method of mineral treatment that includes stages of mineral grinding, mineral agglomeration with a adhesive, disposition in heaps and irrigation with sulfuric acid and a bacterial culture. It is important to highlight that the invention described in this patent does not include the agglomeration of the ground mineral on a support nor the maintenance of high temperatures during the leaching process.

U.S. Pat. No. 6,063,158 (MBX SYSTEMS, INC) describes an agglomeration method of mineral concentrate on a sphere shaped polyethylene matrix with a ring and a pin. The method also includes the use of *T. thiooxidans* to bioleach the agglomerated concentrate in systems of columns at ambient temperature.

U.S. Pat. No. 6,083,730 (Geobiotics Inc.) claims a method that consists of the agglomeration of a sulfide mineral concentrate on the surface of a thick mineral particle (volcanic rock, gravel or rock) with a size that ranges from 0.6 to 2.5 cm. This material is arranged in heaps for later bioleaching.

U.S. Pat. No. 8,491,701 claims a bioleaching method that consist of a first step of mineral agglomeration, the inoculation of the agglomeration with bacteria and their nutrients. The patent describes that at least part of the heap leaching consists of agglomerated material. However, it does not claim that there is an agglomeration method.

U.S. Pat. No. 8,119,085 describes a mineral leaching method that consists of grinding the mineral, agglomerating it in a agglomerator through the addition of water, a binder and an acid. Afterwards, heaps are formed which are irrigated with a solution that contains sulfur oxidizing bacteria.

U.S. Pat. No. 6,096,113 describes a bioleaching method in a closed tank that consists of treating part of the mineral with biooxidizing microorganisms. This pretreated mineral is then agglomerated on the non-treated mineral material. The agglomeration requires the use of drying materials and flocculants in a agglomeration device. This process is orientated to refractory minerals that contain precious metals, which are recovered from the oxidized product in the heap, through a heating process and then the addition of a leaching agent (such as cyanide).

U.S. Pat. No. 5,766,930 describes a method that mainly describes a method for bioremediate contaminated soils with organic substances in heaps, without shaking. The method consist of mixing the substrate, to be remedied, with layers of thick material selected among stones, pieces of brick, pieces of cement and plastic.

The GEOCOAT® technology consists of depositing a layer of sulfide concentrate on a support rock of a specified size, piling said material in heaps, irrigating it with solutions of acidic nutrients and providing air under low pressure to the base of the heap. After the biooxidation, the concentrate is removed from the rock support by wet sieving. The residue of the concentrate is then neutralized and subject to traditional methods of gold recovery. The support can be recycled.

Some of the disadvantages of this technology are that the substrate of the agglomeration is not completely inert to microbial action and of the acid. In addition, due to its mineral nature, the cost of the energy involved, both for the agglomeration and the recovery of the rock support, is by far superior to that of the technology of the present invention.

The present invention is different to the technologies developed by Geobiotics in that it considers an agglomeration substrate that is inert to the microbial activity and acid, is stable at high temperatures, is uniform in size, and has a low density. This last characteristic permits that the substrate be more easily recovered for its reuse.

From another perspective, the proposed technology resembles in part to the oxidation technologies of reduced compounds that in the moment they are oxidized, they become less dangerous. The reactions are similar to ones that occur in the oxidizing conversion of ammonium ($NH_4^+$) to nitrate ($NO_3^-$), for example in water treatment systems. In these systems, plastic particles are used as substrates on what microorganisms grow, forming biofilms. The solution to be treated is poured in the superior part of the reactor and percolates through the reactor while in a counter-current manner airflow enters from the base of the reactor.

This same principle has been suggested to be used in biomining in the proposed scheme of Vardanyan el al. (12), with the difference in this case that the authors propose to use substrates that are both organic and inorganic as systems of support, among which are mentioned calcium alginate, carrageenans, ceramic supports, activated carbon and porous matrices based on glass so that microorganisms with capacities to oxidize ferrous ions to ferric can bind. Afterwards, the bacteria bound to the support matrices are irrigated on their surface with a rich solution of ferrous ions while the reactor is aerated in a counter-current manner with air from its base. The irrigated solution percolates through the matrix/microorganism bed, accelerating the oxidization reaction and elevating the electrochemical potential of the solution, which can later be used for leaching sulfide and mixed copper minerals.

DETAILED DESCRIPTION

The present invention describes a product that provides a support material for mineral concentrates to be leached. The purpose of the support is to allow the adhesion of the mineral concentrates in a stable form so that they can be treated by leaching in packed bed or heap reactors. Through the action of microorganisms or of chemical elements solutions loaded with metals of interest, contained in the concentrate matrix, can be obtained.

More specifically, the invention refers to the use of a support compose of polymeric particles that are: between 3 and 20 mm, have a specific gravity of less than 1, are stable in highly corrosive environments such as strong acid solutions, are resistant to abrasion, are not deformable at temperatures up to 100° C., and have the capacity to bind to the surface on mineral concentrates forming agglomerates in a stable form. These agglomerates are composed of polymeric particles covered by a fine layer of mineral concentrate and are obtained through a physical process that allows agglomeration through the use of a rotary drum or similar technologies.

Said agglomerates can be packed homogeneously in a reactor or placed in a heap.

This configuration of reactor or heap improves the known recoveries from mineral concentrates with high impurity contents in comparison to the leaching processes described in the previous art.

It is also an attribute of this invention to produce minimum amounts of effluents (rubble and/or tailings) and, in general, potentially polluting and damaging emissions for the environment. In addition, it reduces the energy demand to obtain metals of economic value.

Another attribute of the invention is that it is an available alternative to the treatment of mineral concentrates other than processes such as smelting. These processes have a higher cost of treatment, and they can be economically infeasible to function. The technology of this invention can increase of the economic value of minerals such as enargite (copper arsenic sulfide, $Cu_3AsS_4$).

The support used in the application of the present invention preferably includes polypropylene particles between 3 and 20 mm, and resistant to temperatures up to 100° C. and high acid concentrations.

The preferred shapes of the polypropylene support can be lenticular, spherical, oval, concave, convex, squared, cylindrical (pellet), rectangular, and/or irregular, and can be hollow or solid, with a smooth or rough surface, or a mix of all the above.

The support is expected to bind to the greatest amount of agglomerated concentrate on its surface without blocking the circulation of the liquid/air in the porous channels of the packed bed.

Once the oxidation or leaching process of the agglomerated concentrate occurs around the support particles, they are to be reused for the new cycle in the reactor. The particles can be washed with diluted acid or water and easily removed from the washing solution since their specific gravity is less than 1, and they float to the surface.

The concentrate that did not react, along with the other solid mineral that were washed, is recovered, thickened, and filtered to be commercialized as re-concentrated minerals. This way the loses, which other leaching technologies have, are decreased.

Generally, in the metallurgical industry where minerals are treated via leaching and bioleaching, the mechanical and hydraulic properties of the leaching reactors in heaps are fundamental in ensuring high recoveries. This is achieved by agglomerating the fine mineral particles around the thicker particles of the same mineral. This results in going from a model where the fine and thick particles are scattered to one where the new agglomerated particles become the dominant typed inside the reactor, maximizing the hydraulic and gaseous conductivity of the bed of the reactor, improving the total kinetics of recovery of the oxidizable metallic contents.

Characteristics of the Concentrate

In the present invention, sulfide mineral concentrates originating from the gravitational concentration process of metal sulfides are used. It is desirable that the size of the particles of the concentrate fluctuate between 20 to 60 micrometers (averaging between 35 and 45 micrometers) and have a water content between 7% and 12%. Once the concentrate is mixed with an amount of acidified water, an acid and/or a microbiological inoculum or, in general, with some liquid, it is called pulp. By liquid, it is understood to be a mix of water and sulfuric acid and in some cases the addition of a microbiological inoculum.

The described method is adequate for the treatment of concentrates of chalcopyrite, covellite, chalcocite, enargite, and refractory gold sulfides, among others.

Acid Curing

The chemical leaching and bioleaching processes of metal sulfides require the addition of large quantities of sulfuric acid to insure that the formation of colloidal silica is not triggered in the interior of the packed bed and as a consequence avoid the canalization and flooding in sectors of a heap. In addition, it allows that the oxidized species are soaked with sulfate as a way to achieve the mobility of these in a solution as sulfated species, since the extraction of the valuable metal contained require acid equivalents. This technology generates a homogenous pulp with a high quantity of acid in the concentrate, specifically between 20 and 50% of the total acid equivalents required for the total dissolution of these; the rest of the acid equivalents are added to both the required solutions to facilitate the agglomeration process of the pulp over the support and the leaching solution used for irrigation in the reactor or heap leaching.

Agglomeration

In order to have optimum contact between the surface of the particle and the leaching solution, it is necessary that a thin layer of concentrate bind to the polymeric support. The adhesion is achieved optionally by putting the pulp in a rotary drum or any other rotatory device. This technology has the flexibility that the supports used are either one size or of a narrow distribution of sizes, it avoids material segregation in the drum and as a consequence an uniformed agglomerate in size and humidity is achieved. This gives the agglomerates favorable attributes for their transportation, handling, piling and mechanical behavior in the leaching stage.

The physical-chemical properties of both the concentrate and support are optimized and allows for an excellent adhesion of a thin layer of concentrate to be achieved due to the pulp concentrate in solutions with high ionic charge.

For the development of this technology, the physico-chemical properties of polypropylene were evaluated to assure that it is a high performing support matrix.

The wetting of the polypropylene and of a concentrate of copper chalcopyrite were determined via the film-flotation technique. The critical surface tension, which determines the degree of wetting of both materials, was determined by observing that the polypropylene gets wet only at surface tensions under 23 mN/m, displaying a highly hydrophobic character. On the other hand, in the case of a concentrate rich in chalcopyrite a critical the surface tension was observed to be 44 mN/m that corresponds to a contact angle of 56.63°, which are very close to the contact angle values found in industrial concentrates. Moreover, the adhesion phenomenon of the first layer of the concentrate on the polypropylene particles can be explained by the forces and the interaction energy between the particles of the concentrate and those of the polypropylene, based on the Born-DLVO Theory (12) assuming a non-saturated porous medium, the configuration proposed in the present invention. The concentrate particles strongly bind to the surface of the polypropylene at the primary minimum zone and with conditions of high ionic strength in the solution, a condition that is present in the leaching operations of copper minerals. If the ionic strength of the medium decreases, due to either the dilution of the leaching solution or the washing of the particles, the Born-DLVO Theory predicts the release of the concentrate particles due to the repulsion forces between the surfaces. Finally, the adhesion between the concentrate particles in the most outer layers is explained by the formation of liquid bridges among the particles.

The ionic strength plays a key role in the adherence, detachment, or removal phenomenon of the concentrate particles on the polymeric support. In general, the solutions used in the hydrometallurgic processes have high ion contents in solution that increases the ionic strength, a condition that significantly favors the adhesion of particles on the polypropylene support. This can also have other positive effects. For example, there can be particles that transport arsenic, mercury, lead ions and others and that bind to the surface, preventing the contamination of the water solutions later in the process, which is positive. Consequently, since the particles remain in the final residue of the leaching cycle, it is possible to wash them in order to carry out another treatment in later stages to stabilize the dangerous contaminants. This is a very competitive advantage in comparison to the other technologies that use mineral particles as a support material because the control of the heap residuals in these cases is not possible.

It is important to mention the presence of colloidal particles and bacteria in solution. In a fixed-bed reactor, these can approach to the solid-solution interface and the gas-liquid interface by the movement of solution and by diffusion. In the case that these particles are negatively charged, they will face a repulsive electrostatic interaction, and not specifically of long-range, not only with other particles such as clay, sediment and bacteria, but also with the charge in the gas-liquid interphase. The hydrodynamic forces can overcome the repulsive barrier of the electrostatic interaction and allow the bonding of very small particles in the gas-solution interphase. In this condition, the forces of interaction of van de Waals begin to act, which are the function of the thermodynamic properties of the concentrate particles as well as of the leaching solution.

The desired thickness of the pulp adhered to the matrix ranges from 0.5 mm to 4 mm. It is preferable that the wet agglomerate be 1 mm to 2 mm thick. Since the support particles are of a granulometric distribution of known and fixed sizes, the present invention proposes a very convenient solution to the problem of achieving a very efficient porosity of the packed bed among particles, which allows for the adequate circulation of the irrigating solution throughout the heap. This is relevant because it significantly improves the total kinetics of the process due to the increase of the effective diffusion velocity of the different species in the core of the phases and through the increase in mass transfer in the gas-liquid and liquid-solid interphases. This permits that the resistance control of the diffusion and the mass transfer are minimized on the total kinetics.

There are various inventions that deal with the agglomeration problem of fines on larger particles to improve the percolation properties of the solutions in the bed of the leaching reactors in heaps, such as the agglomeration drum (Pudahuel mine), and others such as U.S. Pat. No. 6,083,730 whose process describes the agglomeration of metal sulfides on a rock support of large size. This present invention replaces the rock support for a synthetic support that allows that the concentrate particles agglomerate around it and that the leaching of secondary components, which can be present in the case of a rock support, is not produced. In this way, the risks of intoxication of the biological components, which are definitely responsible of maintaining the metabolic activity in the bed of the reactor, are avoided.

Another attribute of this technology is that no additional investment is required to treat the solutions because a synthetic support is used instead of a mineral one. Furthermore, this optimizes the acid consumption, making the use of this supply more selective, and as a consequence it is possible to increase the savings in operating costs substantially. Moreover, the use of a plastic support matrix with polypropylene characteristics allows that the species which did not react in the leaching reactor to be washed and recovered. This permits the recycling of these values that are not lost as in the case of the other technologies. In addition, by using a plastic matrix of low density, this technology decreases the energy costs in terms of transport and load in the operation, translating into savings of around 56% in the specific consumption of energy in comparison with a mineral support.

In addition to having mechanical and thermal properties which makes the synthetic support resistant to the forces of traction and compression, the support material is characterized as having excellent resistance to abrasion and being resistant to corrosive solutions and high temperatures specific to the activity of hyperthermophilic microorganisms (close to 80° C.). These properties along with their availability in the market were the motivation to consider polypropylene as a support matrix to be used in this technology.

Leaching Solution

The leaching solution is composed of water, sulfuric acid, and a portion of a culture of one or more species of microorganisms in suspension in a solution of $H_2SO_4$ 10 g/L and pH between 1 and 2.5. The preferred microorganisms, due to their leaching capacities, are *Acidithiobacillus ferrooxidans, Sulfolobus acidocalodarius, Acidianus brierleyi, Sulfolobus metallicus, Leptospirillum ferrooxidans, Thiobacillus thiooxidans* without excluding others. Once the leaching reactor is defined, this solution is defined as the irrigation solution since it can be reapplied in the heap as many times as it is required. The agglomeration process starts with a pulp of the concentrates in a strong acidic solution with microorganism, or very acidic with chloride ions (NaCl and/or $CaCl_2$). The ratio solid/solution is between 75 and 80% w/w solids.

The acid curing technique can also be used since the leaching processes require the sulfation of the metallic species contained with the purpose to make them soluble in aqueous mediums. It is highly probable that the agglomeration with high loads of acid allows the accelerating sequential recovery of copper in the leaching stage.

The inoculation of the process can be carried out in different stages. It can be added in the pulp solution, in the initial form of the irrigation solution, or jointly with the addition of the irrigation solution during all the leaching cycle.

Reclamation of the Heap

Once the time dedicated to the leaching of the mineral or the agglomerated concentrate piled over the pad of the heap leaching, the systems of irrigation, either sprinklers or droppers and above, are removed and the work to remove the piled material to tailing dumps, where the piled material can still be subject to irrigation but under condition of much less control with respect to what was accustomed in the heap leaching. There are different mechanisms and equipment used in the task of lifting the heap of the leaching but it depends to a great extent the size of the operation in question. In particular, the use of a buck-wheel reclaimer, normally associated to conveyor belt systems, can be mentioned to transport the tailing to its containment site, or the use of bulldozers normally associated with transportation systems using dump trucks.

Given the low density of the agglomeration support proposed in the present invention, the cost and energy required to lift the material already processed in the heap or reactor is estimated to be improved significantly in terms of the wear and tear of the equipment and the overall energy efficiency of the process.

Washing and Recirculation of the Agglomeration Support

In the heap leaching process and except in the case proposed by the GEOCOAT® technology in which the concentrate associated to a rock particle support as its agglomeration substrate for the concentrates is processed, the minerals already processed are taken to their final destination site or leaching tailing dumps.

In the present invention, the treated material passes through a washing stage that occurs in a Trommel type washer. Through the rotating mechanic action and added washing solution, the fine particles of the concentrate that did not react or the precipitates formed in the leaching stage detach from the support particles. The idea of this stage is to separate the fine particles from the big ones which holds them as a means, on one hand, to recover the metal values contained in the non-reacted concentrates and, on the other hand, to recover the big particles to reuse them in a new leaching cycle.

Due to the low density of the support matrix proposed in this invention, the washing and separation of the non-reacted particles from the support matrix stage is greatly facilitated, resulting in improvements in the efficiency of the process and lower operating costs.

Reactor Configurations

Heaps. For the treatment of low grade tailings, this configuration is more adequate than stirred-tank type reactors. The tailings are place on an impermeable base and an adequate amount of leaching solution is added. This acidic solutions percolates through the tailings allowing the bacteria to transform the ferrous ions to ferric ions and generating acid for the dissolution and solubilization of the mineral. These heaps can be aerated passively or actively (jointly with a flow of liquid or through tubes in the bottom of the heap). The solution rich in copper or metals of interest (Pregnant Liquid Solution, PLS) that is obtain in the heap is collected for the subsequent recovery of the metal, normally via solvent extraction and electrodeposition techniques. However, the metals can also be processed by cementation techniques with scrap iron.

Stirred-tank reactors. This configuration requires that the reactors be fed with air using distributors that allow the maximum area of gas-liquid mass transfer. They are more efficient than heap reactors, taking some days instead of weeks or months in the case of heap reactors. One of the disadvantages is the amount of solid that can be maintained in suspension is limited to approximately 5% and no more than 25%. In addition, it has a high maintenance cost in comparison to heap reactors, so minerals of high value are mainly used such as gold-bearing concentrates. These type of reactors have not resulted in being economically feasible in treating metal concentrates such as chalcopyrite ($CuFeS_2$) or enargite ($Cu_3AsS_4$) which require temperatures of 75-80° C. Column. The column reactors are used as bank scale reactors and allow to validate leaching processes in unsaturated packed bed type reactors. The configuration of the reactors in columns corresponds to a vertical cylindrical column made of plastic material. The columns used in this case have a height of 2 to 6 m and an internal diameter of 14 cm and are heated via an electric coat controlled by a thermocouple. The temperature of the bed of the column is measure by the insertion of a thermometer through the wall of the column to gain access to the material inside. The columns are normally made of polyethylene or polypropylene tubes. The column is mounted on a system of supports and is loaded with the agglomerated material to be leached at the superior part. The irrigation solution is poured in at the superior part so as to percolate throughout the packed bed. The base of the column counts on a support system of packed material. Below this, there is a space that allows the collection of the percolated solutions which are soon characterized by their pH, Eh, total Fe concentrations, Cu and free acid. Air is inject into the column from the inferior zone of the column so as to supply the necessary gases. The air is forced to spread through packed material in the bed of the column, using a hose with a loop in the inferior part of the column which allows that the leaching solutions leave. This configuration acts as a hydraulic seal that prevents that the forced air inside of the column escape from this way.

EXAMPLES

Example 1: Physicochemical Properties of the Polypropylene Support

The support material is characterized by being made of polypropylene, having a diameter between 3 and 20 mm. Said material is resistant to temperatures up to 100° C.

Tests were made to the support by placing it in an environment of pH 0.2, verifying that it did not suffer any physical or chemical modifications.

It is inert to the action of microorganisms typically used in bioleaching and biooxidation.

Recovery test of the support: The polypropylene support, after its use, proved to be easily recoverable, by washing it with water and due to its low density and good flowability.

Load tests allowed to establish the ratio of the concentrate that can be effectively agglomerated on the plastic support particle. For these tests, two types of polypropylene support matrices are used, one in the shape of a pellet (cylindrical) between 2 and 5 mm in diameter, and the other in the form of spheres of a diameter of 20 mm.

The concentrate to be agglomerated, previously pulped via the addition of a water solution acidulated with 10 g/L of sulfuric acid, to a final concentration of 80% of solids is added to a known weight and volume of a dry plastic matrix that acts as a support. The final result is a ratio of load of concentrate to support between 0.5 to 0.8 w/w.

Example 2: Leaching of Chalcopyrite Sulfide in a Column

The agglomeration process was carried out in a agglomeration drums wherein acid in the range of 40 to 60 kg of acid/ton of concentrate, water in the range of 60 to 90 kg/ton of concentrate and previously grown bacterial inoculum were added. The rotation velocity fluctuated between 5 to 15 rpm and the residence time varied between 1 to 3 minutes until the thickness of the adhered concentrate reach 1 to 4 mm. The particles with previous agglomeration were load in polypropylene columns in a manner to generate a homogeneous packed bed. Fresh leaching solution is made to circulate above this bed. The column operated continuously and the leaching solution was poured at the center of the superior extreme of the column at a surface velocity in a range from 7 to 20 L/hm². The solution contained 35 to 45 mg/L of $(NH_4)_2SO_4$, 35 to 45 mg/L of $MgSO_4.7H_2O$ and 35 to 45 mg/L of $K_2HPO_4$. This configuration allow to achieve the optimal conditions of momentum transport, heat and mass for each support particle.

After several hours of chemical leaching with $H_2SO_4$, a fresh solution, containing ferrous ion of concentrations between 1 and 2.5 g/L, was introduced to the top part of the columns. The pH and the potential Eh of the solution was measured regularly as well as the concentrations of $Fe^{3+}$ and $Fe^{2+}$, total copper, free acid and the concentration of bacteria in the solution. The leaching columns were maintained operating for 320 days. Air was administered at the base of each column with a compression bolt, oil free. This air penetrated at the base of the column via forced convection.

Results: Recovery above 90% of Cu, above 55% of FE, in 320 days and negative net consumption of acid.

Example 3: Agglomeraction with Inoculum

During the agglomeration stage, the concentrates repulped in acid and water where inoculated with a mix culture of sulfide-oxidizing bacteria of an extreme thermophilic nature. This culture had been previously used in bioleaching in mineral and copper sulfide concentrate bioreactors. The culture contained species types *Acidothiobacillus ferrooxidans, Sulfobacillus metallicus, Acidianus* sp, *Leptospirillum* sp, among others.

The culture was grown with samples from different sources. Some were obtained from hot spring environments and at temperatures of 68° C. and supplemented with yeast extract of 0.2%. The substrate for the growth of these bacteria was mineral concentrate finely divided of Pucobre, and were placed in different shake flasks 5% w/v in 0K basal medium, supplemented with yeast extract of 0.2% w/v to have the inoculum for the columns. These initial inocula were previously biologically increased in 30 L stir tanks, 5% p/v of mineral concentrate in 0K basal medium supplemented with yeast extract 0.2%. The volume of the operation was maintained at 70° C. and stirred at 200 rpm with a blade mechanical stirrer and aerated at a rate of 3 L/min. To inoculate each column, a inoculum with a population of around $10^8$ to $10^9$ bacteria/mL was used, resulting in a final culture population density in the order of $10^7$ to $10^8$ bacteria/g of mineral concentrate. To maintain a scalable hold up in each column, a ratio of 0.5 to 0.8 kg of concentrate/support mass was used.

Example 4: Leaching with Different Supports and Leaching Mediums

Tests were carried out in 6 columns of heights of 2 m: 150 days for tests in a chloride medium (columns 1, 3, 4), and 300 days for biological mediums (columns 2, 5, 6).

All the experiments were maintained at a pH less than 2 via the addition of concentrated sulfuric acid to the irrigation solution. Once the pH of the exiting solutions stabilized under this value, the pH was not readjusted.

The conditions applied, type of support used and the percentages of recovery are shown on the following table (Table 2).

TABLE 2

| Column | Matrix | Condition | Irrigation Rate (L/h/m²) | Aeration Rate (L/min) | Temperature (° C.) | Fresh Supply (Kg) Concentrate | Fresh Supply (Kg) Matrix | Gravel (Kg) Concentrate | Gravel (Kg) Matrix | Head Cu Grade (%) | Head Fe Grade (%) | Gravel Cu Grade (%) | Gravel Fe Grade (%) | Recovery (%) Cu | Recovery (%) Fe |
|---|---|---|---|---|---|---|---|---|---|---|---|---|---|---|---|
| 1 | Pellets | NaCl + CaCl₂ | 12 | 4 | 20 | 11.3 | 14.0 | 8.3 | 13.8 | 27.3 | 30.0 | 19.0 | 28.6 | 49.3 | 30.4 |
| 3 | Pellets | NaCl + CaCl₂ | 12 | 4 | 20 | 13.0 | 13.0 | 9.6 | 12.9 | 27.3 | 30.0 | 16.9 | 25.3 | 54.4 | 37.6 |
| 4 | Spheres | NaCl | 12 | 4 | 20 | 5.7 | 3.2 | 4.8 | 3.1 | 27.3 | 30.0 | 22.5 | 29.0 | 30.5 | 18.1 |
| 2 | Pellets | Bacteria | 12 | 4 | 55 | 11.8 | 12.7 | 3.2 | 12.5 | 27.3 | 30.0 | 12.1 | 26.4 | 87.9 | 76.0 |
| 5* | Spheres | Bacteria | 12 | 4 | 50 | 8.4 | 3.4 | 3.8 | 3.3 | 27.3 | 30.0 | 5.9 | 23.6 | 90.2 | 64.4 |
| 6* | Spheres | Bacteria | 12 | 4 | 52 | 8.6 | 3.4 | 4.2 | 3.3 | 27.3 | 30.0 | 6.9 | 23.6 | 87.7 | 61.6 |

*C5 and C6 are duplicated

The given grades of head and gravel feeding of the first set of test in columns were obtained by an average of the results obtained in 4 different laboratories. These packages, given to the laboratories, were prepared by an external company (IDICTEC) where selections were made for the delivery of samples. Samplings were carried out by rifle and, then, cone and quartering. The samples were sent to the laboratories GEOLAQUIM, SGS, IDICTEC and an internal laboratory.

Example 5: Washing and Recovery of the Polymeric Support

After the end of leaching, the support is washed with water in the rotary drum, freeing all the adhered elements and leaving the support clean and available for the next operation cycle.

The residual concentrate recovered can be subsequently processed to obtain the valuable contents in it or adequately disposed of in the case there is no economic value.

Glossary

Agglomeration: process of mixing minerals with concentrated sulfuric acid, refined or water to produce the incorporation of the fine particles with the big on so as to make the heaps permeable. The formation of agglomerates is fundamental when the mineral presents high level of fine particles.

Bioleaching: extraction of minerals from its mineral source through microbial action.

Biomining: extraction of elements from solid material through the use of bacteria and fungi.

Bioxidation: the oxidation of the mineral host that contains the metallic component of interest through the use of microorganisms.

Acid curing: process where commercial concentrated acid is added to the minerals. In this stage, the acid is distributed in a homogeneous manner to all the mineral so as to increase the kinetics of leaching. The acid is chemically pre-treated to improve the kinetics of copper dissolution and inhibit the dissolution of silica and act as a binding agent among the particles.

Charged electrolyte: an aqueous solution of concentrated copper 30 g/L, that feeds the electrodeposition process.

EW (electrodeposition): electrochemical process in which the dissolved metal in a charged electrolyte is converted to its metallic form through the application of a continuous current (300 A/m$^2$) forming a metallic cathode.

Agglomerate: a particle consisting of a support surrounded by thin layer of adhered concentrate as a result of the agglomeration process.

ILS: a median charged solution coming from worn out leaching reactors.

Leaching: dissolution of metals from its mineral ore through the action of a solution.

Heap pad: a prepared area for piling, and normally has a 3% incline, a layer of sand, an impermeable polyethylene liner, drain ducts, a layer of gravel, a drain canal; ducts for a system of aeration in bioleaching can be included.

PLS: a solution loaded with copper coming from the leaching reactors.

Porosity of a particle: ratio expressed in the percentage between the total number of pores of a particle and its total volume.

Refine solution: the drained solution of the leaching process after the extraction of the metals from the solution.

Sulfation: process that occurs after the acid curing of the mineral in which the oxidized metals complexed in its sulphate form, hydrating itself and increasing its solubility.

SX (solvent extraction): process of concentration and purification of dissolved metals in an aqueous solution by passing it through a selective organic matrix for the metal.

REFERENCES (1) Acevedo: The use of reactors in biomining processes, Electronic Journal of Biotechnology (2000) 3, 184-194
(2) Breed, a W. et al. The effect of temperature on the continuous ferrous-iron oxidation kinetics of a predominantly *Leptospirillum ferrooxidans* culture. *Biotechnol. Bioeng.* 65, 44-53 (1999).
(3) "Hydrometallurgical Technology for the Leaching of Minerals and Copper Concentrats in the Presence of Chloride Ion" Book printed in 2012 by Antofagasta Minerals, S. A. Invented and Developed by Minera Michilla S.A.
(4) M. E. Clark, y cols. Biotechnology in minerals processing: Technological breakthroughs creating value Hydrometallurgy (2006) 83, 3-9.
(5) Montealegre y cols. Copper sulfide hydrometallurgy and the thin layer bacterial leaching technology of Sociedad Minera Pudahuel. In: Cooper, W. C., Dreisinger, D. B., Dutrizac, J. E., Hein, H., Ugarte, G. (Eds.), Copper '95—Cobre '95: Proc. Intl. Conference (Santiago, Chile) Volume III—Electrorefining and Hydrometallurgy of copper. TMS, Warrendale, pp 781-793.
(6) First chapter introduce by Juan Rivadeneira Hurtado. Sobral, L. G. (Ed.). III Oliveira, D. M. (Ed.), IV. Souza, C. E. G (Ed.). Biohydrometallurgical process: a practical approach/Ed. Luis Gonzaga Santos Sobral, Débora Monteiro de Olivera e Carlos Eduardo Gomes de Souza-Rio de Janeiro: CETEM/MCT, 2010. 324 p.:il. ISBN 978-85-61121-85-3 CDD 660.0183
(7) Barreto M. y cols. Identification of a gene cluster for the formation of extracellular polysaccharide precursors in the chemolithoautotroph *Acidithiobacillus ferrooxidans*. Applied and Environmental Microbiology (2005) 71, 2902-2909.
(8) Rohwerder T. et al, Progress in bioleaching: fundamentals and mechanism of bacterial metal sulfide oxidation. Appl. Microbiol. Biotechnol. (2003) 239-248.
(9) Escobar B, Godoy I, Pardo E y Wiertz J. V, "Bioleaching of copper concentrates by *Thiobacillus ferrooxidans* at increasing pulp density" Biohydrometallurgical processing (1995) 273-281.
(10) Goebel B. M y cols. Cultural and phylogenetic analysis of mixed microbial populations found in natural and commercial bioleaching environments. Applied and Environmental Microbiology (1994) 60, 1614-1621.
(11) Guerrero J. J, Microbs and mining. Mining and oil weekly. (1998). 121.
(12) Hahn M. W; Abadzic D; O Mellia C. R. Environ. Sci. Technol. 2004 Nov. 15, 38(22) pp 5915-24
(13) Vardanyan A. K., Marcosyas L. S., Vardanjan N. S. immovilization of new isolated iron oxidizing bacteria on natural carriers. Guiliani N, et al (edit), Advanced materials research (2013) Vol 825. 388-391.
(14) Meruane, G., Salhe, C., Wiertz, J. & Vargas, T. Novel electrochemical-enzymatic model which quantifies the effect of the solution Eh on the kinetics of ferrous iron oxidation with *Acidithiobacillus ferrooxidans*. *Biotechnol. Bioeng.* 80, 280-8 (2002)

The invention claimed is:

1. A leaching method of metal bearing material or mineral concentrates, the method comprising:
   a. forming agglomerates from a polypropylene material and a metal bearing material or mineral concentrates, wherein the agglomerates are composed of the polypropylene material covered on its surface thereof by a thin layer of metal bearing material or mineral concentrates;
   b. transporting the agglomerates to a processing site;
   c. loading the agglomerates to a packed bed reactor or forming a heap of the agglomerates;
   d. leaching the mineral concentrate with chemical and biological agents contained in an acidic solution having, which is supplied by irrigation;
   e. recovering a pregnant leach solution that percolated in the reactor or heap for its subsequent treatment;
   f. removing solid residuals from the reactor or heap; and
   g. separating the solid residuals from unleached mineral concentrates, and any formed precipitates with chemical and biological solutions.

2. The method of claim 1, further comprising:
supplying forced air to the reactor or heap in a countercurrent direction to the irrigation solution.

3. The method of claim 1, wherein the polypropylene material has a material size between 3 mm and 20 mm having a specific gravity less than 1,
   wherein the polypropylene material is stable in highly corrosive environments, including strong acidic solutions, is resistant to abrasion, and is non-deformable at temperatures up to 100° C.

4. The method of claim 1, wherein between 0.5 and 0.8 kg of mineral concentrate is loaded per kilogram of support.

5. The method of claim 1, wherein the packed bed reactor or the heap operate under a non-saturated manner with an irrigation rate of up to 20 L/hm$^2$, avoiding preferential flows of the irrigation solution and allowing uniform flows of air in a counter-current direction.

6. The method of claim 1, wherein the mineral concentrate is a primary sulfide or a secondary base metal, a mineral rich in noble metals bound to sulfides, an iron concentrate, or a concentrate with high amounts of impurities.

7. The method of claim 1, wherein one or more biological oxidizing agents and/or nutrients are added when the agglomerates are formed and/or are supplied in the irrigation solution.

8. The method of claim 1, wherein one or more chemical oxidizing agents are added when the agglomerates are formed and/or are supplied in the irrigation solution.

* * * * *